United States Patent
Chen et al.

(10) Patent No.: US 9,455,634 B2
(45) Date of Patent: *Sep. 27, 2016

(54) DC-DC POWER CONVERSION APPARATUS

(71) Applicant: HEP TECH CO., LTD., Taichung (TW)

(72) Inventors: Po-Yen Chen, Taipei (TW); Ching-Tsai Pan, Hsinchu (TW); Ta-Sheng Hung, Taichung (TW)

(73) Assignee: HEP TECH CO., LTD., Taichung (TW)

( * ) Notice: Subject to any disclaimer, the term of this patent is extended or adjusted under 35 U.S.C. 154(b) by 207 days.

This patent is subject to a terminal disclaimer.

(21) Appl. No.: 14/324,722

(22) Filed: Jul. 7, 2014

(65) Prior Publication Data

US 2016/0006357 A1    Jan. 7, 2016

(51) Int. Cl.
*H02M 3/335* (2006.01)
*H02M 1/00* (2006.01)

(52) U.S. Cl.
CPC ..... *H02M 3/335* (2013.01); *H02M 2001/0048* (2013.01); *Y02B 70/1433* (2013.01); *Y02B 70/1491* (2013.01)

(58) Field of Classification Search
CPC ........... H02M 2001/0048; H02M 2001/0054; H02M 2001/346; H02M 3/335; H02M 3/33507
See application file for complete search history.

(56) References Cited

U.S. PATENT DOCUMENTS

| 6,295,213 | B1* | 9/2001 | Smith | H02M 3/33569 363/21.01 |
| 8,134,351 | B2* | 3/2012 | Cuk | H02M 3/005 323/271 |
| 2001/0005322 | A1* | 6/2001 | Uchida | H02M 1/34 363/97 |
| 2009/0225574 | A1* | 9/2009 | Fornage | H02M 3/335 363/123 |
| 2010/0277955 | A1* | 11/2010 | Duan | H02M 3/33569 363/21.02 |
| 2013/0343098 | A1* | 12/2013 | Kern | H02M 3/33569 363/21.12 |
| 2014/0084898 | A1* | 3/2014 | Pan | H02M 3/335 323/311 |
| 2014/0085937 | A1* | 3/2014 | Chen | H02M 3/33507 363/20 |
| 2015/0280580 | A1* | 10/2015 | Chen | H02M 3/33507 307/17 |

* cited by examiner

*Primary Examiner* — Fred E Finch, III
(74) *Attorney, Agent, or Firm* — Ming Chow; Sinorica, LLC

(57) ABSTRACT

A power conversion apparatus, which converts power of a DC power supply and provides it to the loading, includes a transformer, an electronic switch, a leakage energy recycling circuit, and a output circuit. The transformer has a primary winding, which receives the power, and a secondary winding, which outputs the converted power. An end of the electronic switch is electrically connected to the primary winding; another end thereof is electrically connected to the DC power supply. The leakage energy recycling circuit is electrically connected to the primary winding, and repeatedly and alternatively outputs power of positive and negative voltage. The circuit receives and stores leakage energy of the transformer, and feedbacks it to the transformer. The output circuit is electrically connected to the secondary winding to receive the converted power and to provide it to the loading.

10 Claims, 7 Drawing Sheets

DC-DC POWER CONVERSION APPARATUS

BACKGROUND OF THE INVENTION

1. Technical Field

The present invention relates generally to power conversion, and more particularly to a power conversion apparatus.

2. Description of Related Art

Typically, a conventional power conversion apparatus converts power with a transformer and other electronic components, and while the transformer works, it would generate corresponding magnetizing inductance and leakage energy, wherein leakage energy is a natural phenomenon which happens due to incomplete coupling of magnetic flux between the primary and secondary windings of the transformer. With wider air gap between the primary winding and the secondary winding, the coupling coefficient of the transformer becomes lower, which generates more leakage energy.

In fact, leakage energy of a transformer can be seen as the parasitic inductance of an equivalent parasitic inductor which is in-series connected to an equivalent inductor of the primary winding. Therefore, while a transformer works, the energy stored in the equivalent inductor of the primary winding is transferred to the secondary winding and the loading, but the energy stored in the leakage energy has no circuit path to go, which causes enormous voltage spikes on other components of the circuit. Therefore, there usually is an additional buffer circuit applied in a transformer to absorb and consume the leakage energy. But such buffer circuit may reduce the performance of the transformer.

However, for those power conversion apparatuses applied in wireless power transmission systems, the coupling coefficient would be greatly lowered with wider air gaps, and as a result, there would be much more leakage energy generated. In such cases, the aforementioned design of buffer circuits would not only greatly reduce the performance of the transformer, but also generate great amount of waste heat due to absorbing and consuming the leakage energy. The lifespans of the transformer itself and other components of the circuit tend to be shortened because of high temperature.

BRIEF SUMMARY OF THE INVENTION

In view of the above, the primary objective of the present invention is to provide a power conversion apparatus, which is able to recycle leakage energy of a transformer, and therefore enhances the power conversion efficiency.

The present invention provides a power conversion apparatus, which converts power of a direct current (DC) power supply and provides the converted power to a loading. The power conversion apparatus includes a transformer, an electronic switch, a first inductor, a first capacitor, and an output circuit. The transformer has a primary winding and a secondary winding, wherein the primary winding receives the power of the DC power supply and has an equivalent primary inductor and an equivalent leakage inductor, while the secondary winding outputs the converted power; the electronic either allows the power of the DC power supply to flow to the primary winding or cuts off the power, wherein the electronic switch has two ends electrically connected to the primary winding and the DC power supply respectively; the first inductor is electrically connected to the primary winding; the first capacitor is electrically connected to the primary winding, and also connected to the first inductor in parallel, wherein the first capacitor receives and stores leakage energy of the equivalent leakage inductor of the primary winding, and forms a resonant circuit with the first inductor to feedback the leakage energy to the transformer, which repeatedly and alternatively reverses a polarity of a voltage drop of the first capacitor; the output circuit is electrically connected to the secondary winding to receive the converted power from the transformer, wherein the output circuit has a second capacitor, which has two ends respectively electrically connected to two ends of the loading to provide the converted power to the loading.

The present invention further provides a power conversion apparatus, which converts power of a direct current (DC) power supply and provides the converted power to a loading. The power conversion apparatus includes a transformer, an electronic switch, a leakage energy recycling circuit, and an output circuit. The transformer has a primary winding and a secondary winding, wherein the primary winding receives the power of the DC power supply and has an equivalent primary inductor and an equivalent leakage inductor, while the secondary winding outputs the converted power; the electronic switch either allows the power of the DC power supply to flow to the primary winding or cuts off the power, wherein the electronic switch has two ends electrically connected to the primary winding and the DC power supply respectively; the leakage energy recycling circuit is electrically connected to the primary winding to receive and store leakage energy of the equivalent leakage inductor of the primary winding, and also to feedback the leakage energy to the transformer, wherein the leakage energy recycling circuit repeatedly and alternatively outputs power of positive voltage and negative voltage; the output circuit is electrically connected to the secondary winding to receive the converted power from the transformer, and to provide the converted power to the loading.

Whereby, with the aforementioned design of circuit, the leakage energy of the transformer can be effectively recycled, which enhances the efficiency of the power conversion apparatus.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
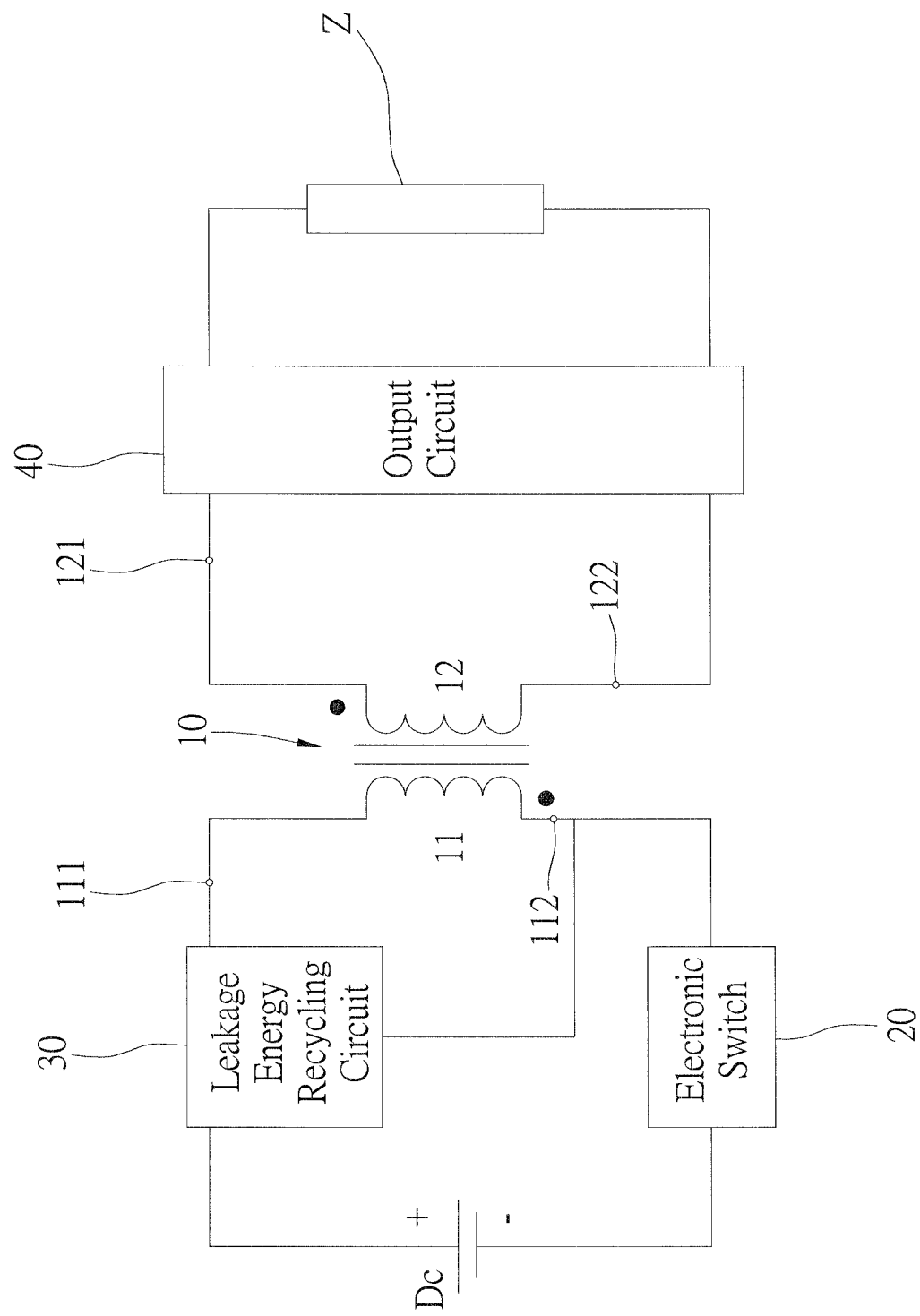
FIG. 1 is a block diagram of the circuit of a first preferred embodiment of the present invention.

As shown in FIG. 1, a power conversion apparatus of the first preferred embodiment of the present invention is able to convert power of a direct current (DC) power supply Dc, and provide the converted power to a loading Z. The power conversion apparatus includes a transformer 10, an electronic switch 20, a leakage energy recycling circuit 30, and an output circuit 40.

Figure 2:
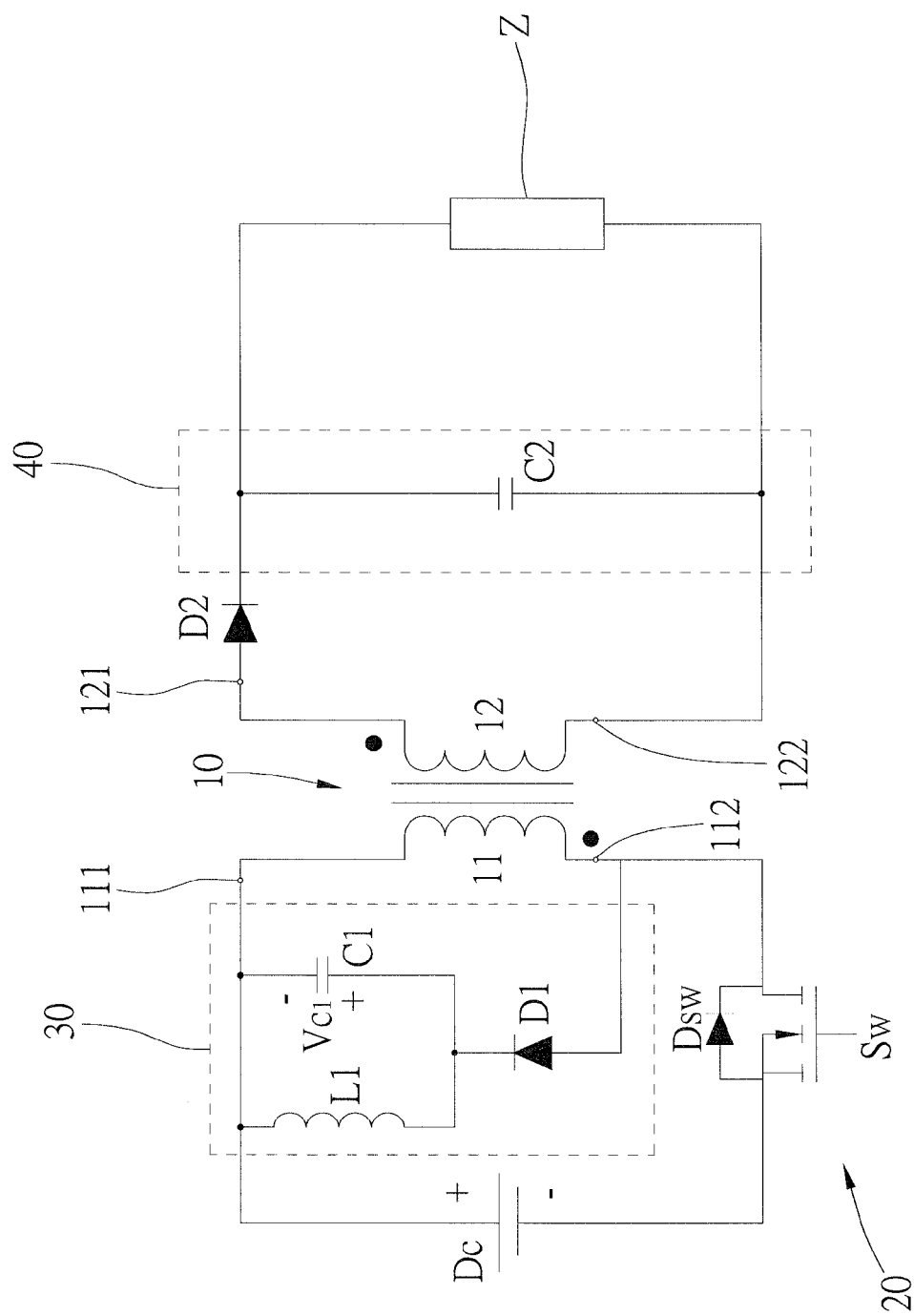
FIG. 2 is a circuit of the first preferred embodiment of the present invention.

The transformer 10 has a primary winding 11 and a secondary winding 12, wherein the primary winding 10 receives the power of the DC power supply Dc, and the secondary winding 12 outputs the converted power. In more details, as shown in FIG. 2, the primary winding 11 has a first end 111 and a second end 112, and the secondary winding 12 has a third end 121 and a fourth end 122, wherein the first end 111 of the primary winding 11 is electrically connected to a positive terminal of the DC power supply Dc. In the preferred embodiment, the transformer 10 is a flyback transformer, and the primary winding 11 and the secondary winding 12 are respectively wound around different iron cores (not shown). In other words, the primary winding 11 and the secondary winding 12 are independent and separated. In practice, of course, the primary winding 11 and the secondary winding 12 of the transformer 10 can be wound around the same iron core together, and therefore are not separated to each other.

The electronic switch 20 has two ends, which are respectively electrically connected to the primary winding 11 and the DC power supply Dc, wherein the electronic switch 20 either allows the power of the DC power supply Dc to flow to the primary winding 11 or cuts off the power. In the preferred embodiment, one of the ends of the electronic switch 20 is electrically connected to the second end 112 of the primary winding 11, and the other end thereof is electrically connected to a negative terminal of the DC power supply Dc. Whereby, the electronic switch 20 is able to allow or disallow the power of the DC power supply Dc to flow through. In more details, the actual structure of the electronic switch 20 includes a metal oxide semiconductor field effect transistor (MOSFET) Sw and a body diode Dsw, wherein a source of the MOSFET Sw is electrically connected to the negative terminal of the DC power supply Dc, and a drain thereof is electrically connected to the second end 112 of the transformer 10. An anode and a cathode of the body diode Dsw are respectively electrically connected to the source and the drain of the MOSFET Sw.

The leakage energy recycling circuit 30 includes a first inductor L1, a first capacitor C1, and a first diode D1, wherein the first inductor L1 and the first capacitor C1 are electrically connected to each other in parallel. The first inductor L1 and the first capacitor C1 both have two ends, wherein one end of each are both electrically connected to the first end 111 and the positive terminal of the DC power supply Dc, and the other end of each are both electrically connected to the cathode of the first diode D1, while the anode of the first diode D1 is electrically connected to the second end 112 and the drain of the MOSFET Sw.

The output circuit 40 is electrically connected to the secondary winding 12 to receive the converted power from the transformer 10, wherein the output circuit 40 has a second capacitor C2. The second capacitor C2 and the loading Z are electrically connected to each other in parallel, wherein an end of the second capacitor C2 is electrically connected to the fourth end 122, and another end of the second capacitor C2 is electrically connected to the third end 121 through a second diode D2. In more details, an anode of the second diode D2 is electrically connected to the third end 121, and a cathode thereof is electrically connected to the second capacitor C2. Therefore, the second capacitor C2 is electrically connected to the secondary winding 12 of the transformer 10 through the second diode D2.

In the preferred embodiment, the input voltage of the DC power supply Dc, the switching frequency of the electronic switch 20, and the specifications of the capacitors C1-C2, the first inductor L1, and the loading Z are shown in the table below:

| | |
|---|---|
| First Inductor L1 | 330 μH |
| First Capacitor C1 | 47 nF |
| Second Capacitor C2 | 10 μF |
| Input Voltage | 12 V |
| Switching Frequency | 100 KHz |
| Resistance of the Loading | 10 Ω |

Figure 3:
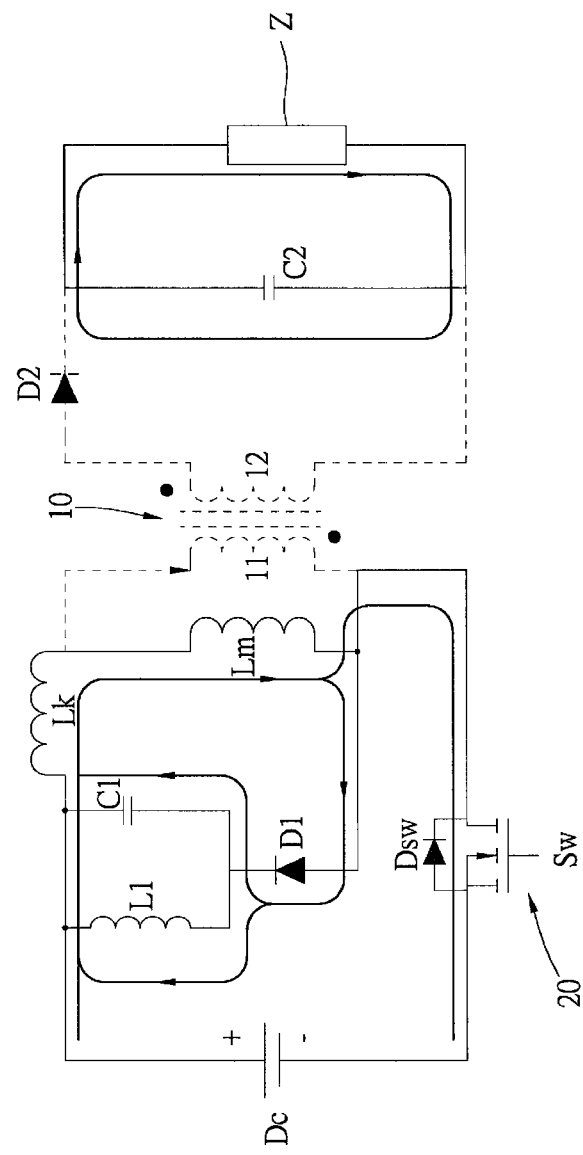
FIG. 3 to FIG. 5 are equivalent circuits of the first preferred embodiment of the present invention during power conversion.
Figure 4:
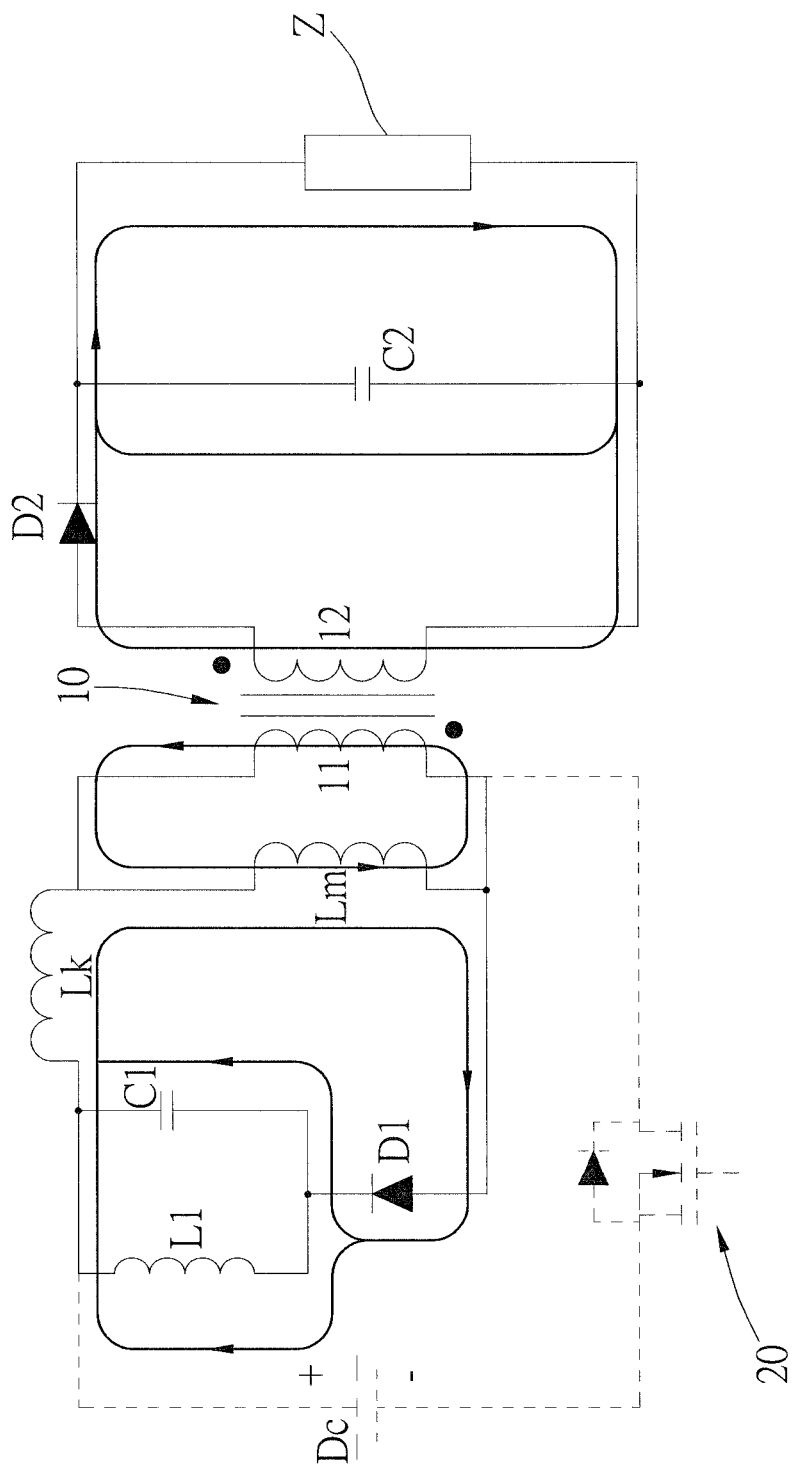
Figure 5:
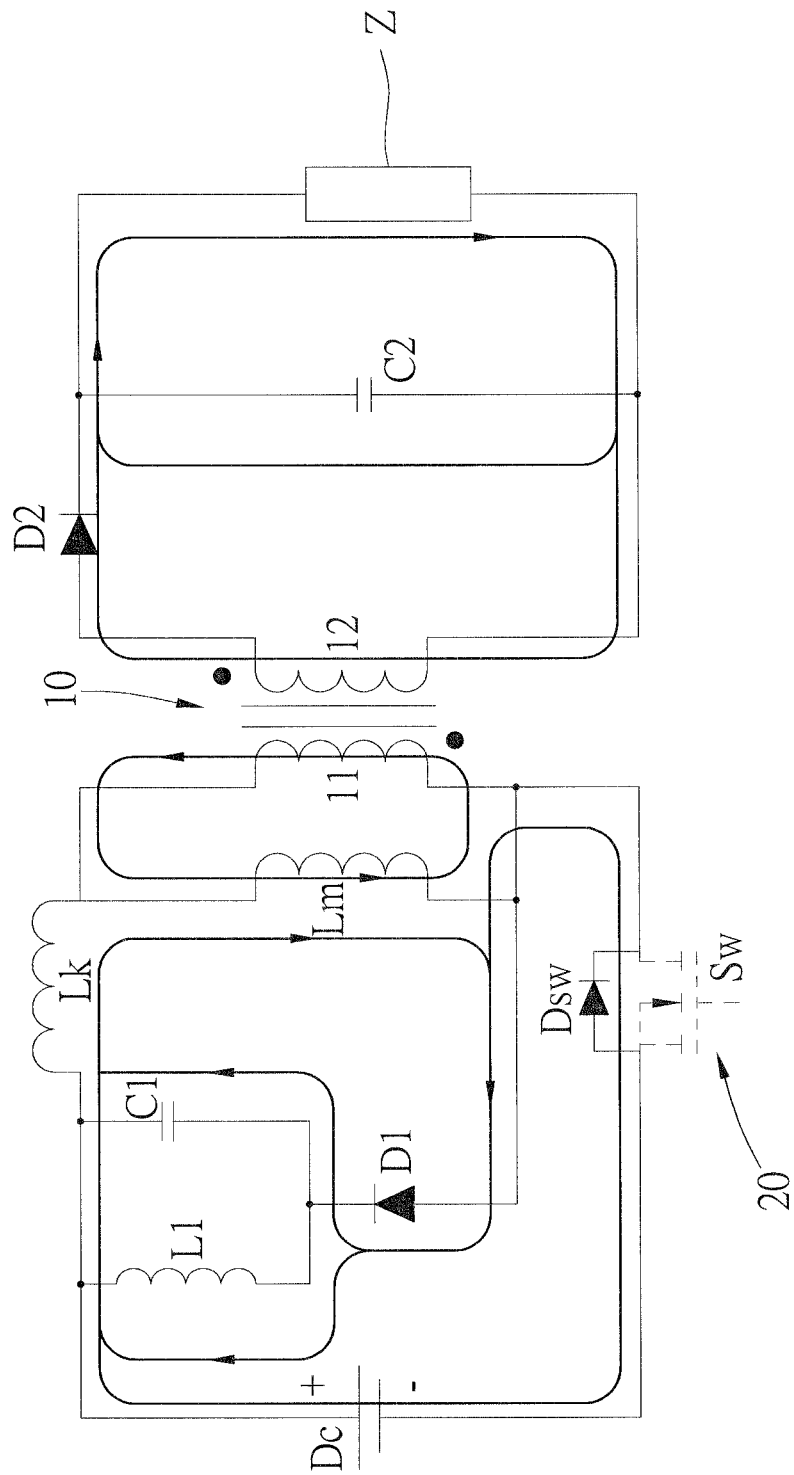

As shown in FIG. 3 to FIG. 5, with the aforementioned structure and specifications, while the power conversion apparatus works, the primary winding 11 of the transformer 10 can be seen as an equivalent primary inductor Lm and an equivalent leakage inductor Lk connected to each other in series. And in the preferred embodiment, inductances of the equivalent primary inductor Lm and the equivalent leakage inductor Lk are 30 μH.

As shown in FIG. 3, when the electronic switch 20 allows the power of the DC power supply Dc to flow to the primary winding 11, energy is stored in the equivalent primary inductor Lm and the equivalent leakage inductor Lk of the primary winding 11 through the electronic switch 20; at the same time, the second capacitor C2 releases energy to the loading Z. The first diode D1 prevents the DC power supply Dc from directly charging the first capacitor C1 and the first inductor L1, and the second diode D2 prevents the energy stored in the second capacitor C2 from being transmitted back to the transformer 10. The accuracy of the circuit can be ensured in this way.

Figure 6:
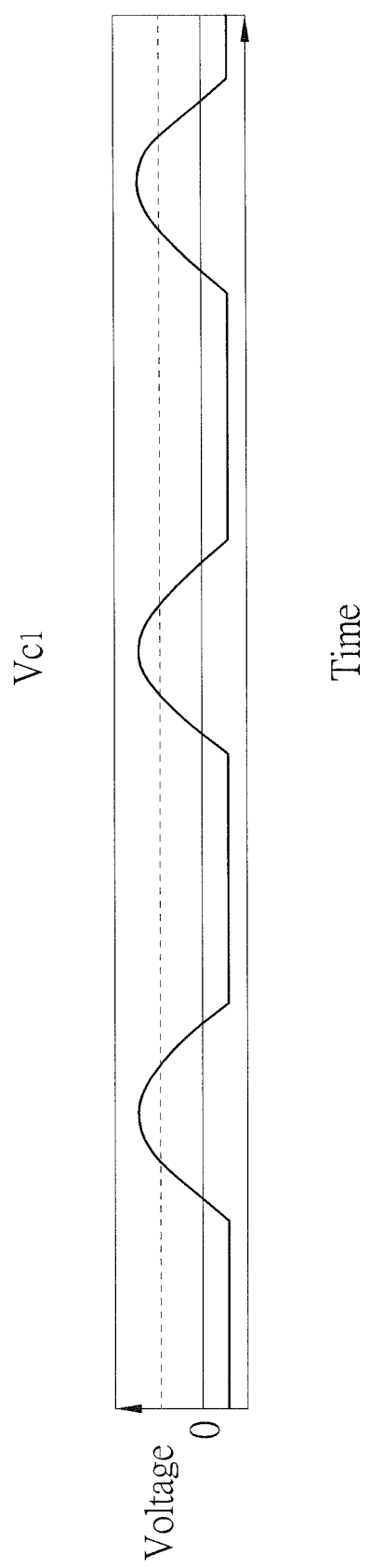
FIG. 6 is an oscillogram of the voltage drop of the first capacitor of the first preferred embodiment of the present invention.

As shown in FIG. 4, when the electronic switch 20 cuts off the power of the DC power supply Dc, the energy stored in the equivalent primary inductor Lm is transferred to the secondary winding 12 to be stored in the second capacitor C2 through the second diode D2, and then provided to the loading Z. Meanwhile, the energy stored in the equivalent leakage inductor Lk is transferred to a resonant circuit formed by the first capacitor C1 and the first inductor L1 through the first diode D1, wherein the first capacitor C2 receives and stores leakage energy of the equivalent leakage inductor Lk of the transformer 10, which avoids enormous voltage spike generated on the electronic switch 20. After that, the equivalent primary inductor Lm releases energy, and the resonant circuit formed by the first capacitor C1 and the first inductor L1 starts to react. As a result, the stored energy of the first inductor L1 is converted into inductive current to charge the first capacitor C1. Consequently, a polarity of a voltage drop of the first capacitor C1 is reversed, as shown in FIG. 6, to conduct the body diode Dsw of the electronic switch 20.

And then, as shown in FIG. 5, when the body diode Dsw of the electronic switch 20 is conducted, the resonant circuit formed by the first capacitor C1 and the first inductor L1 starts to transmit the stored energy to the primary winding 11 of the transformer 10, and therefore the equivalent primary inductor Lm keeps releasing energy, until the electronic switch 20 allows the power to flow through again. At this time point, the status of these components is back to what is shown in FIG. 3, and the whole process described here is defined as a cycle.

Therefore, if the power conversion apparatus keeps working, the cycle goes on and on, unless the power conversion apparatus stops working.

Whereby, with the aforementioned design of the leakage energy recycling circuit 30, the whole circuit structure of the body diode Dsw is changed before and after the power being allowed to flow through during each cycle, which makes the polarity of the voltage drop of the first capacitor C1 get repeatedly and alternatively reserved. In this way, the leakage energy recycling circuit 30 repeatedly and alternatively outputs power of positive and negative voltage. Hence the leakage energy of the transformer 10 can be received and stored, and then feedbacked back to the transformer 10. The consumption of the leakage inductance of the primary winding 11 can be reduced, and therefore enhances a power conversion efficiency of the transformer 10.

Figure 7:
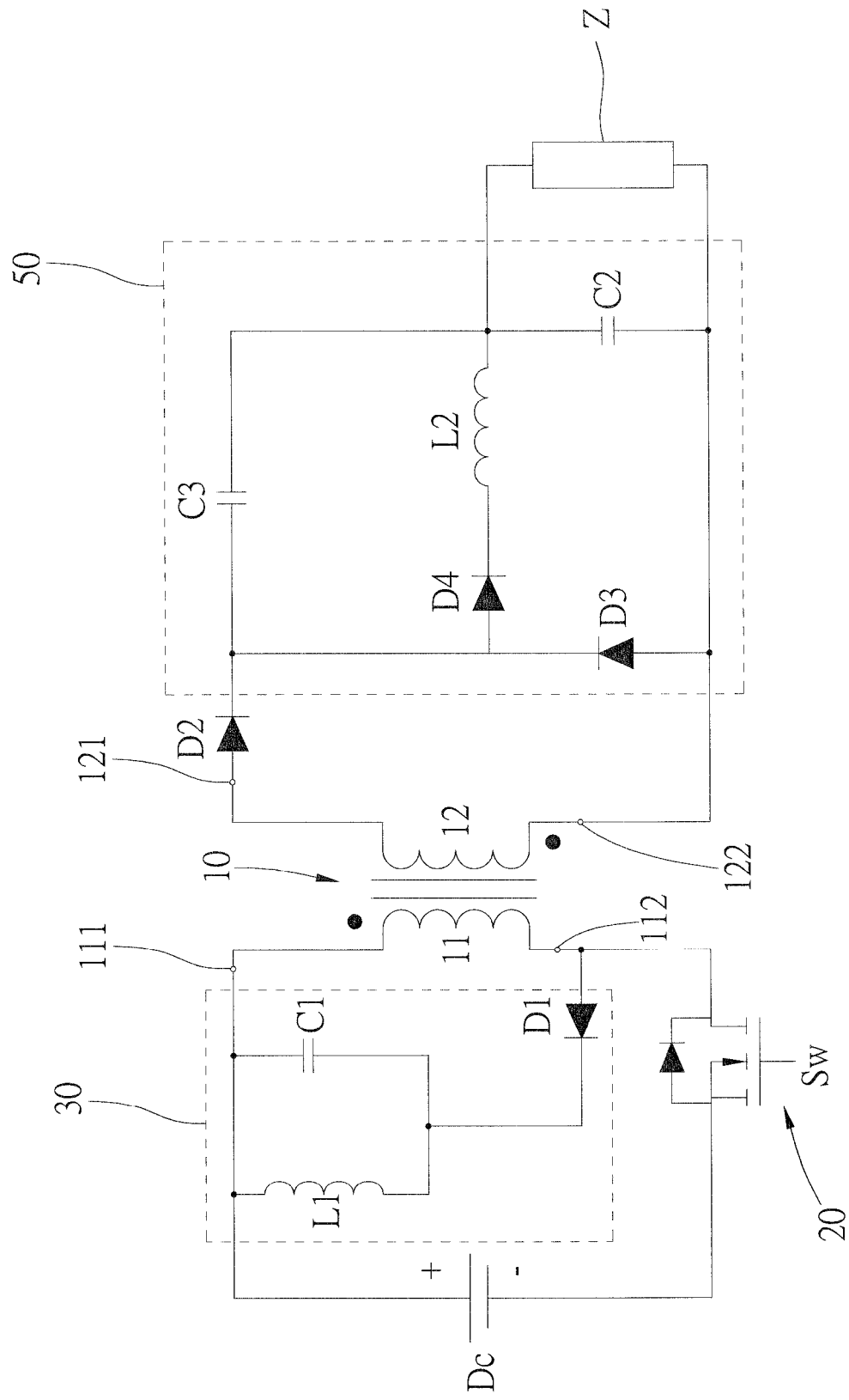
FIG. 7 is a circuit of a second preferred embodiment of the present invention.

An alternative design of the leakage energy recycling circuit 30, i.e. the second preferred embodiment of the present invention, is shown in FIG. 7, which also enhances the power conversion efficiency. An output circuit 50 of a power conversion apparatus of the second preferred embodiment further includes a third diode D3, a third capacitor C3, a second inductor L2, and a fourth diode D4, wherein an anode of the third diode D3 is electrically connected to the fourth end 122, and a cathode thereof is electrically connected to the third end 121 through the second diode D2. An end of the third capacitor C3 is electrically connected to the cathodes of the second diode D2 and the third diode D3, another end of the third capacitor C3 is electrically connected to the second capacitor C2 and the loading Z. An end of the second inductor L2 is electrically connected to the third capacitor C3, the second capacitor C2, and the loading Z, while another end of the second inductor L2 is electrically connected to a cathode of the fourth diode D4. An anode of the fourth diode D4 is electrically connected to the third capacitor C3 and the cathodes of the second diode D2 and the third diode D3. Therefore, the second inductor L2 is electrically connected to the cathode of the third diode D3 through the fourth diode D4.

With the aforementioned design of the output circuit, the third capacitor C3 and the second inductor L2 form another resonant circuit, which changes an equivalent circuit structure of the third diode D3 before and after the power being allowed to flow through. A polarity of a voltage drop of the third capacitor C3 is therefore repeatedly and alternatively reserved, and the barrier set by a voltage of the loading Z can be compensated with negative voltage drop of the third capacitor C3. Whereby, the power conversion efficiency and an effect of suppressing ripple of the transformer 10 can be improved, and a power factor thereof can be enhanced as well.

It must be pointed out that the embodiments described above are only some preferred embodiments of the present invention. All equivalent structures which employ the concepts disclosed in this specification and the appended claims should fall within the scope of the present invention.

What is claimed is:

1. A power conversion apparatus, which converts power of a DC power supply and provides the converted power to a loading, comprising:
    a transformer having a primary winding and a secondary winding, wherein the primary winding receives the power of the DC power supply and has an equivalent primary inductor and an equivalent leakage inductor, while the secondary winding outputs the converted power;
    an electronic switch which either allows the power of the DC power supply to flow to the primary winding or cuts off the power, wherein the electronic switch has two ends electrically connected to the primary winding and the DC power supply respectively;
    a first inductor electrically connected to the primary winding;
    a first capacitor electrically connected to the primary winding, and also directly connected to the first inductor in parallel, wherein the first capacitor receives and stores leakage energy of the equivalent leakage inductor of the primary winding, and forms a resonant circuit with the first inductor to feedback the leakage energy to the transformer, which repeatedly and alternatively reverses a polarity of a voltage drop of the first capacitor; and
    an output circuit electrically connected to the secondary winding to receive the converted power from the transformer, wherein the output circuit has a second capacitor, which has two ends respectively electrically connected to two ends of the loading to provide the converted power to the loading.

2. The power conversion apparatus of claim 1, wherein the primary winding has a first end and a second end; a positive terminal of the DC power supply is electrically connected to the first end; one of the two ends of the electronic switch is electrically connected to the second end of the primary winding, while the other end of the electronic switch is electrically connected to a negative terminal of the DC power supply; the first inductor and the first capacitor both have two ends, wherein one end of the first inductor and one end of the first capacitor are both electrically connected to the first end of the primary winding, while the other end of the first inductor and the other end of the first capacitor are both electrically connected to the second end of the primary winding.

3. The power conversion apparatus of claim 1, further comprising a first diode, wherein the first diode has two ends, one of which is electrically connected to the first capacitor and the first inductor, while the other of which is electrically connected to the transformer, and therefore the first capacitor and the first inductor are electrically connected to the transformer through the first diode.

4. The power conversion apparatus of claim 3, wherein for the first diode, the end electrically connected to the transformer is an anode thereof, and the end electrically connected to the first capacitor and the first inductor is a cathode thereof.

5. The power conversion apparatus of claim 1, further comprising a second diode, wherein the second diode has two ends, one of which is electrically connected to the transformer, while the other of which is electrically connected to the output circuit, and therefore the transformer is electrically connected to the output circuit through the second diode.

6. The power conversion apparatus of claim 5, wherein for the second diode, the end electrically connected to the transformer is an anode thereof, and the end electrically connected to the output circuit is a cathode thereof.

7. The power conversion apparatus of claim 1, wherein the secondary winding has a third end and a fourth end; the output circuit further comprises a third diode, a third capacitor, and a second inductor; an anode of the third diode is electrically connected to the fourth end, and a cathode of the third diode is electrically connected to the third end; the third capacitor has two ends, one of which is electrically connected to the cathode of the third diode, while the other of which is electrically connected to the second capacitor and the loading; the second inductor has two ends, one of which is electrically connected to the third capacitor, the second capacitor, and the loading, while the other of which is electrically connected to the cathode of the third diode.

8. The power conversion apparatus of claim 7, wherein the output circuit further comprises a fourth diode having two ends, one of which is electrically connected to the cathode of the third diode, while the other of which is electrically connected to the second inductor, and therefore the second inductor is electrically connected to the cathode of the third diode through the fourth diode.

9. The power conversion apparatus of claim 8, wherein for the fourth diode, the end electrically connected to the cathode of the third diode is an anode thereof, and the end electrically connected to the second inductor is a cathode thereof.

10. The power conversion apparatus of claim 1, wherein the electronic switch comprises a MOSFET and a body diode; a source and a drain of the MOSFET are respectively electrically connected to the DC power supply and the transformer; the body diode has two ends respectively electrically connected to the source and the drain.

* * * * *